Figure 1:
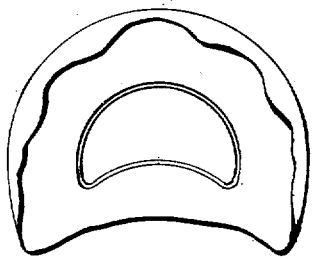
Figure 2:
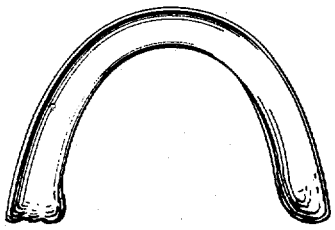

D. M. LAMB.

Dental-Plate.

No. 6,633. Reissued Sept. 7, 1875.

WITNESSES

J. Schattin

E. E. Smith

INVENTOR

Daniel M. Lamb

By Knight Bros Attorneys

N. PETERS, PHOTO-LITHOGRAPHER, WASHINGTON, D. C.

UNITED STATES PATENT OFFICE.

DANIEL MARTIN LAMB, OF LONDON, CANADA.

IMPROVEMENT IN DENTAL PLATES.

Specification forming part of Letters Patent No. 159,687, dated February 9, 1875; reissue No. 6,633, dated September 7, 1875; application filed May 26, 1875.

DIVISION A.

*To all whom it may concern:*

Be it known that I, DANIEL MARTIN LAMB, of London, in the Province of Ontario, Canada, have discovered and produced a new Vulcanite for the Manufacture of Dental Plates, and for other purposes.

The new vulcanite to which my discovery relates is produced from the juice of plants of the asclepias or milkweed family.

In carrying out my discovery I obtain the juice from milkweed by a process such as set forth in either of the patents heretofore granted to me, and numbered 140,281, 140,282, 144,622, and 144,623.

The juice having been properly separated from the fiber, and inspissated until it acquires the necessary consistence, is subjected to vulcanization according to the process usually practiced for the vulcanization of green caoutchouc by the admixture of sulphur or any known and suitable substitute or equivalent therefor, and the subsequent application of heat while the material is molded to the desired form.

My new vulcanite is very valuable in its application to the manufacture of dental plates.

The accompanying drawings represent upper and lower dental plates of common form, either of which can be advantageously made from the new vulcanite.

Dental plates constructed of my new vulcanite are found to possess peculiar characteristics, which distinguish them from common rubber-vulcanite dental plates, and give to this application of my discovery great practical value. The new vulcanite is exceedingly light, and is of a cool quality, rendering it more agreeable, as well as more healthful, in use. It is tasteless in the mouth, and when properly prepared and cleaned of its solvent it is inodorous. It is not liable to be acted on chemically by the saliva. The improvement thus removes a serious, and, in many cases, fatal, difficulty in the use of the ordinary rubber-vulcanite dental plates, especially with patients who are or have been required to use mercury in any form.

The new vulcanite is harder and stronger than that in common use. It can be furnished at so low a cost as to remove all temptation to or liability of adulteration. It bears a much higher degree of heat without injury than common india-rubber, and hence is not liable to destruction in the treatment which is necessary to complete vulcanization.

The following is claimed as new:

A dental plate constructed of the vulcanized inspissated juice of a plant of the asclepias or milkweed family.

D. M. LAMB.

Witnesses:

OCTAVIUS KNIGHT,
CHAS. J. GOOCH.